US010091086B2

(12) United States Patent
Prabhakar et al.

(10) Patent No.: US 10,091,086 B2
(45) Date of Patent: Oct. 2, 2018

(54) SYSTEM AND METHOD FOR PROVIDING AN APPLICATION PROGRAMMING INTERFACE MANAGER FOR USE WITH A SERVICE BUS RUNTIME

(71) Applicant: Oracle International Corporation, Redwood Shores, CA (US)

(72) Inventors: Kiran Prabhakar, Redwood Shores, CA (US); Dimitri Laloue, Sunnyvale, CA (US); Prabhu Thukkaram, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 206 days.

(21) Appl. No.: 15/088,775

(22) Filed: Apr. 1, 2016

(65) Prior Publication Data
US 2016/0294667 A1    Oct. 6, 2016

Related U.S. Application Data

(60) Provisional application No. 62/142,893, filed on Apr. 3, 2015.

(51) Int. Cl.
*G06F 15/16* (2006.01)
*H04L 12/26* (2006.01)
*H04L 29/08* (2006.01)

(52) U.S. Cl.
CPC .............. *H04L 43/14* (2013.01); *H04L 43/08* (2013.01); *H04L 67/10* (2013.01);
(Continued)

(58) Field of Classification Search
CPC .................................................. H04L 67/2804
See application file for complete search history.

(56) References Cited

U.S. PATENT DOCUMENTS 7,681,203 B2 * 3/2010 Mandato ................. H04L 67/16
709/223
9,672,137 B1 * 6/2017 Allocca ............... G06F 11/3664
(Continued)

OTHER PUBLICATIONS

Joe Zou et al., "From Representational State Transfer to Accountable State Transfer Architecture", 8 pages, 2010.
(Continued)

*Primary Examiner* — Hieu Hoang
(74) *Attorney, Agent, or Firm* — Tucker Ellis LLP (57) ABSTRACT

In accordance with an embodiment, described herein is a system and method for managing APIs exposed from proxy services executing in a service bus runtime. Each proxy service can be exposed as an API entry in an API catalog, where the API entry can be annotated with metadata, and published to an API portal. The published API entries can be subscribed to by an API consumer for an application. The application can pass an API key when invoking a proxy service corresponding to a subscribed API entry. A proxy interceptor associated with the corresponding proxy service can intercept the service invocation, and delegate the service invocation to an API managing component. The proxy interceptor can provide the API key and a proxy service reference to the API managing component, which can use the API key to collect usage metrics of the API subscription for display at the API portal.

20 Claims, 7 Drawing Sheets

(52) U.S. Cl.
CPC .......... *H04L 67/1095* (2013.01); *H04L 67/28* (2013.01); *H04L 67/2804* (2013.01); *H04L 67/2823* (2013.01); *H04L 67/32* (2013.01)

(56) References Cited

U.S. PATENT DOCUMENTS

| | | | |
|---|---|---|---|
| 2006/0034237 A1* | 2/2006 | Patrick | H04L 67/14 |
| | | | 370/338 |
| 2008/0310392 A1 | 12/2008 | Dowling | |
| 2011/0131318 A1 | 6/2011 | Maes | |
| 2011/0265164 A1 | 10/2011 | Lucovsky | |
| 2012/0089726 A1 | 4/2012 | Doddavula | |
| 2012/0185821 A1 | 7/2012 | Yaseen | |
| 2012/0239620 A1* | 9/2012 | Masini | H04L 67/1095 |
| | | | 707/634 |
| 2013/0019000 A1 | 1/2013 | Markus | |
| 2013/0046894 A1 | 2/2013 | Said | |
| 2013/0086204 A1 | 4/2013 | Ghosh | |
| 2014/0075016 A1 | 3/2014 | Chatterjee | |
| 2014/0173594 A1 | 6/2014 | Ng | |
| 2014/0181306 A1 | 6/2014 | Kothamasu | |
| 2014/0280494 A1 | 9/2014 | Samoylenko | |
| 2015/0019735 A1* | 1/2015 | Pogrebinsky | G06F 17/3089 |
| | | | 709/226 |
| 2015/0067013 A1 | 3/2015 | Scoda | |
| 2015/0213259 A1 | 7/2015 | Du | |
| 2016/0026461 A1* | 1/2016 | Bannister | G06F 8/73 |
| | | | 717/123 |
| 2016/0088023 A1 | 3/2016 | Handa | |
| 2016/0171682 A1 | 6/2016 | Abedini | |

OTHER PUBLICATIONS

Rest Resources and Methods, Dec. 8, 2014, SmartBear Software, 6 Pages.
Getting Started with Rest APIs—Enterprise Service Bus 4.7.0—WS02 Documentation, 11 Pages.
United States Patent and Trademark Office, Office Action dated Feb. 14, 2018 for U.S. Appl. No. 15/088,790, 13 Pages.
Raul Garcia-Tinedo et al., "Cloud-as-a-Gift: Effectively Exploiting Personal Cloud Free Accounts via Rest APIs", 2013 IEEE Sixth International Conference on Cloud Computing, © 2013 IEEE, pp. 621-628.

* cited by examiner

SYSTEM AND METHOD FOR PROVIDING AN APPLICATION PROGRAMMING INTERFACE MANAGER FOR USE WITH A SERVICE BUS RUNTIME

CLAIM OF PRIORITY

This application claims the benefit of priority to U.S. Provisional Application titled "SYSTEM AND METHOD FOR PROVIDING AN API MANAGER IN AN ENTERPRISE SERVICE BUS ENVIRONMENT", Application No. 62/142,893, filed Apr. 3, 2015, which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to service bus systems, and are particularly related to a system and method for providing an application programming interface (API) manager for use with a service bus runtime.

BACKGROUND

Today's development community has grown rapidly to include not only the information technology department, but also mobile application developers, line of business (LoB) developers, and third-party developers that can work for a vendor, partner, or other external constituency.

In many instances, this diverse group needs to be able to easily identify and access an organization's software assets to build or extend applications without directly dealing with a complex information technology infrastructure. As a result, today's applications increasingly use application programming interfaces (APIs) to manage the links between critical back-end business processes, and facilitate connections from many types of devices and computing platforms, from mobile phones and tablets to household devices to personal health trackers and automotive systems.

As API use increases and the development community expands, the management and visibility of these APIs becomes increasingly important.

SUMMARY

In accordance with an embodiment, described herein is a system and method for managing APIs exposed from proxy services executing in a service bus runtime. Each proxy service can be exposed as an API entry in an API catalog, where the API entry can be annotated with metadata, and published to an API portal. The published API entries can be subscribed to by an API consumer for an application. The application can pass an API key when invoking a proxy service corresponding to a subscribed API entry. A proxy interceptor associated with the corresponding proxy service can intercept the service invocation, and delegate the service invocation to an API managing component. The proxy interceptor can provide the API key and a proxy service reference to the API managing component, which can use the API key to collect usage metrics of the API subscription for display at the API portal.

DETAILED DESCRIPTION

A service bus system, for example Oracle Service Bus (OSB), provides a software architecture for mediating messages among services that are loosely coupled, independently deployed, and heterogeneous and disparate. A service bus system can include a service bus runtime, and a management console used for configuring and managing the service bus runtime.

A service bus runtime relies on message flows defined by proxy services to transform and route messages between the loosely coupled services. The proxy services can be exposed as application programming interfaces (API) for reuse by internal developers, external developers, and partners.

Glossary

The following terms are used throughout this document:

API Developer: In accordance with an embodiment, this persona is a service bus developer responsible for the development of the proxy services and pipelines using standard service bus tools like JDeveloper or service bus consoles. An API developer can have full access to the service bus design environment to build APIs. For example, an API developer can use JDeveloper to build proxy services and pipelines, and deploy them to an API Manager instance.

API Curator: In accordance with an embodiment, the curator is responsible for annotating the proxy services and marking them as APIs via publishing. Curation can be available via a service bus console.

API Monitor: In accordance with an embodiment, the API monitor is responsible for monitoring API subscriptions. Monitoring can be available using an API Portal.

API Consumer: In accordance with an embodiment, this persona represents the end-user of an API. An API consumer is an abstract consumer not limited to be an individual.

API: In accordance with an embodiment, an API is a HTTP REST or SOAP proxy service published by the API Curator. There is a one-to-one relationship between the API and the proxy service, regardless of the SOAP operations or REST resources that can be defined on the proxy service.

API Subscription: In accordance with an embodiment, an API can be subscribed to by multiple API consumers, as well as by multiple applications for a given API consumer. An API subscription defines the relation between the consumer, Application and API. Each API subscription can be managed and monitored independently at runtime.

Consumer Account: In accordance with an embodiment, no explicit registration is required for an API consumer to use the API portal. Instead, any user with role API consumer can login directly. An account is implicitly tied with a username. For multiple individuals working as a team on a project to share the account and its applications, they need to share the same username. An API consumer can be either an individual or a virtual user.

Service Bus Runtime

Figure 1:
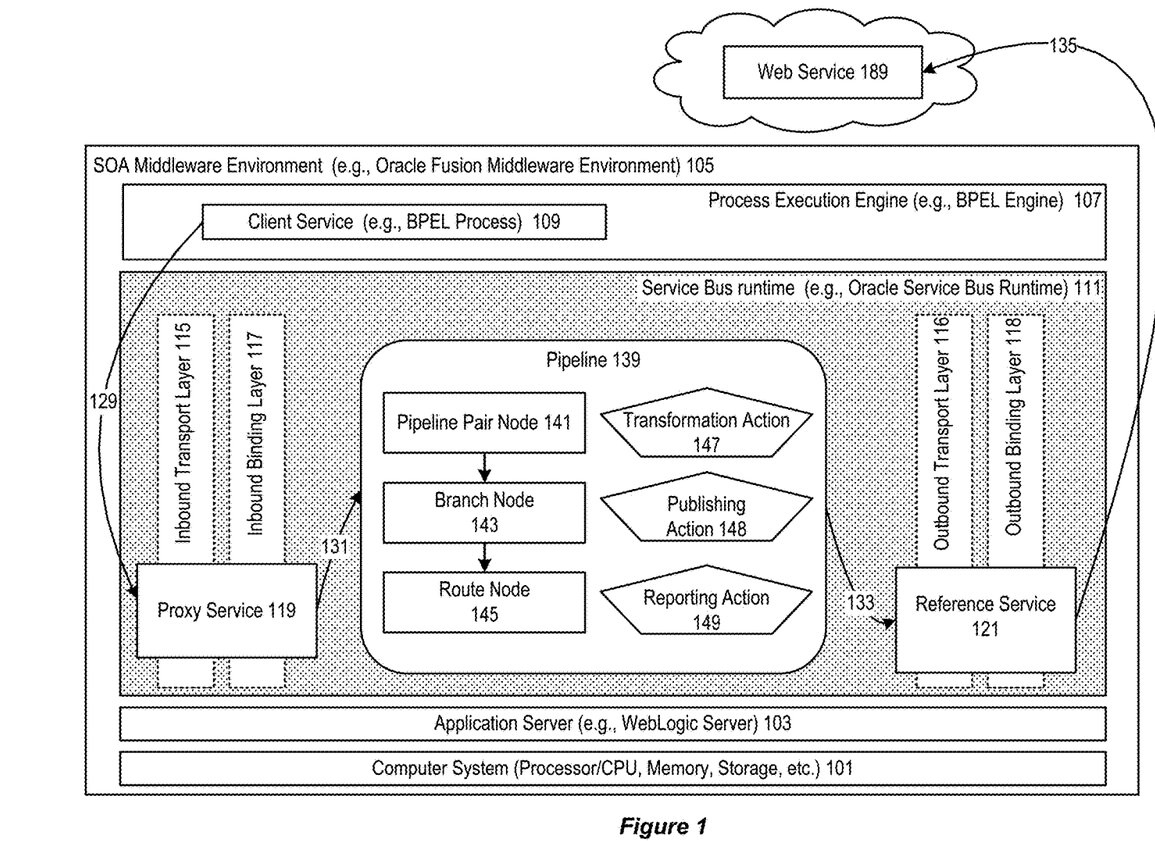
FIG. 1 illustrates a service bus runtime in accordance with an embodiment, in accordance with an embodiment.

FIG. 1 illustrates a typical service bus runtime, in accordance with an embodiment.

As shown in FIG. 1, a service bus runtime (for example, an Oracle Service Bus runtime) 111 can be provided as a software component within a service-oriented architecture (SOA) middleware environment (for example, an Oracle Fusion middleware environment) 105 which executes on an application server (for example, WebLogic Server) 103 on a computer 101 including memory and microprocessors.

In accordance with an embodiment, the service bus runtime can include one or more proxy services (for example proxy service 119), and one or more reference services (for example, reference service 121).

As used herein, in accordance with an embodiment, a proxy service represents a service bus definition of an intermediary web service hosted locally in the service bus runtime. A proxy service's configuration can include its interface, the type and configuration of the transport it uses to connect with a client service, security requirements, and service level agreement (SLA) alert rules.

In accordance with an embodiment, the implementation of a proxy service can be defined by a message flow, which can include a plurality of components to define a logic for routing and manipulating messages as they flow through the proxy service. The message processing logic in a message flow can be defined by a pipeline. A pipeline represents a sequence of user-configured processing steps (stages) for a message. Each stage can be a pipeline element, and can include one or more actions that define the handling of messages as the messages flow through a proxy service at runtime. A pipeline can also be associated with a plurality of nodes configured to route messages through the pipeline.

As shown in FIG. 1, a pipeline 139 can include a pipeline pair node 141, a branch node 143 and a route node 145. The pipeline pair node can tie together a single request and a single response pipeline into one top-level element. The branch node enables message processing to proceed down one of several possible paths by comparing values in a table of string values with a value in a message. The route node can define destinations for messages, and can perform request and response communication with another service. A plurality of actions (for example, transformation action 147, publishing action 148, and reporting action 149) can be associated with the pipeline to implement a processing logic for the messages.

As used herein, in accordance with an embodiment, reference services can be a service bus definition of an external service to which the service bus runtime is a client, and can be used to define access to the external service.

For example, the reference service shown in FIG. 1 can define how to access 135 an external web service 189, and can specify an endpoint URI/location and interface of the external web service.

In accordance with an embodiment, the service bus runtime can include an inbound transport layer 115 and an outbound transport layer 116, and an inbound binding layer 117 and an outbound binding layer 118. The inbound transport layer is a communication layer between a client service and the service bus runtime, and acts as the entry point for messages into the service bus runtime. It can handle raw bytes of message data in the form of input/output streams, including returning response messages to a client service and handling meta-data for messages, including endpoint URIs and transport headers. The inbound transport layer can support a plurality of transport protocols, including HTTP(S), JMS, FTP, File, and E-mail. Similarly, the outbound transport layer handles communication between external services and the service bus runtime, and supports the plurality of transport protocols as described above.

In accordance with an embodiment, the inbound binding layer and the outbound binding layer can pack and unpack messages as necessary, handle messages security, and hand the messages off to pipelines for processing.

In accordance with an embodiment, the service bus runtime can provide intelligent message brokering between external services (for example, enterprise services and databases) and service clients (for example, presentation applications) through proxy services, which can be developed using an interactive development environment (IDE) (for example, Oracle JDeveloper), or configured using a web-based management console (for example, Oracle service bus console). The service bus runtime can enable client services to exchange messages with an intermediary proxy service, rather than directly with a reference service. Since a proxy service can be independently implemented and dynamically configured, as driven by business needs, the service bus runtime can route messages between different types of services, without requiring costly infrastructure development and re-deployment efforts.

In the exemplary service bus runtime as shown in FIG. 1, the proxy service can receive 129 a message from a client service 109 in a process execution engine 107, and pass 131 the message to the pipeline which can transform data of the message into a format required by the reference service. The proxy service can receive 133 the message from the reference service, and send the message to the external web service in the cloud. The process execution engine can be a business process language execution (BPEL) engine, and the client service can be a BPEL process instance executing on the process execution engine.

In accordance with an embodiment, a message routed through the service bus runtime can be associated with a message context defined by an XML schema. The message context can include a set of properties (context variables) holding content of the message and information for the message. The message context variables can be accessed and manipulated using, for example XQuery expressions, in actions in pipeline stages. The context variables can include a header, a body and an attachment which can be initialized using the message content received by a proxy service. The message content in the context variables can be used to construct outgoing messages routed or published to other services.

In accordance with an embodiment, a proxy service or reference service can be implemented using Simple Object Access Protocol (SOAP) and defined by a web service definition language (WSDL) file, or representational state transfer (REST) architectural style.

REST represents an architectural style that specifies a plurality of architecture constraints (for example, decoupling consumer services from producer services, stateless existence, and uniform interface). A REST-based service (REST service) typically uses HTTP as its underlying protocol and uses HTTP requests to post data, get data, and delete data. A REST service can be associated with a web application description language (WADL) document that describes and defines the REST service.

In accordance with an embodiment, the service bus runtime can include a virtualization layer to support REST services, which can invoke, or be invoked by, a WSDL-based pipeline. A REST proxy service can convert a payload of a REST native format, for example JavaScript Notation (JSON) format, to SOAP format before invoking a pipeline, while a REST reference service can be invoked by a pipeline, and can convert the payload from SOAP to a REST native format.

API Manager

As described above, a service bus runtime can host a plurality of proxy services of various types, including REST and SOAP proxy services.

It can be useful to have an API manager that can facilitate the creation of APIs that expose the functionality of these proxy services, and publish the APIs for use by application developers.

In accordance with an embodiment, the system can be used to manage APIs exposed from proxy services executing in a service bus runtime. Each proxy service can be exposed as an API entry in an API catalog, where the API entry can be annotated with metadata, and published to an API portal. The published API entries can be subscribed to by an API consumer for an application. The application can pass an API key when invoking a proxy service corresponding to a subscribed API entry. A proxy interceptor associated with the corresponding proxy service can intercept the service invocation, and delegate the service invocation to an API managing component. The proxy interceptor can provide the API key and a proxy service reference to the API managing component, which can use the API key to collect usage metrics of the API subscription for display at the API portal.

In accordance with an embodiment, each API entry can represent an API exposed from a proxy service implemented and executing in the service bus runtime, and can be published using a front end URL.

In accordance with an embodiment, the system can combine a service bus runtime hosting proxy services, an API catalog, an API portal, a service bus console, and an API managing component, into a fully integrated API management platform.

Figure 2:
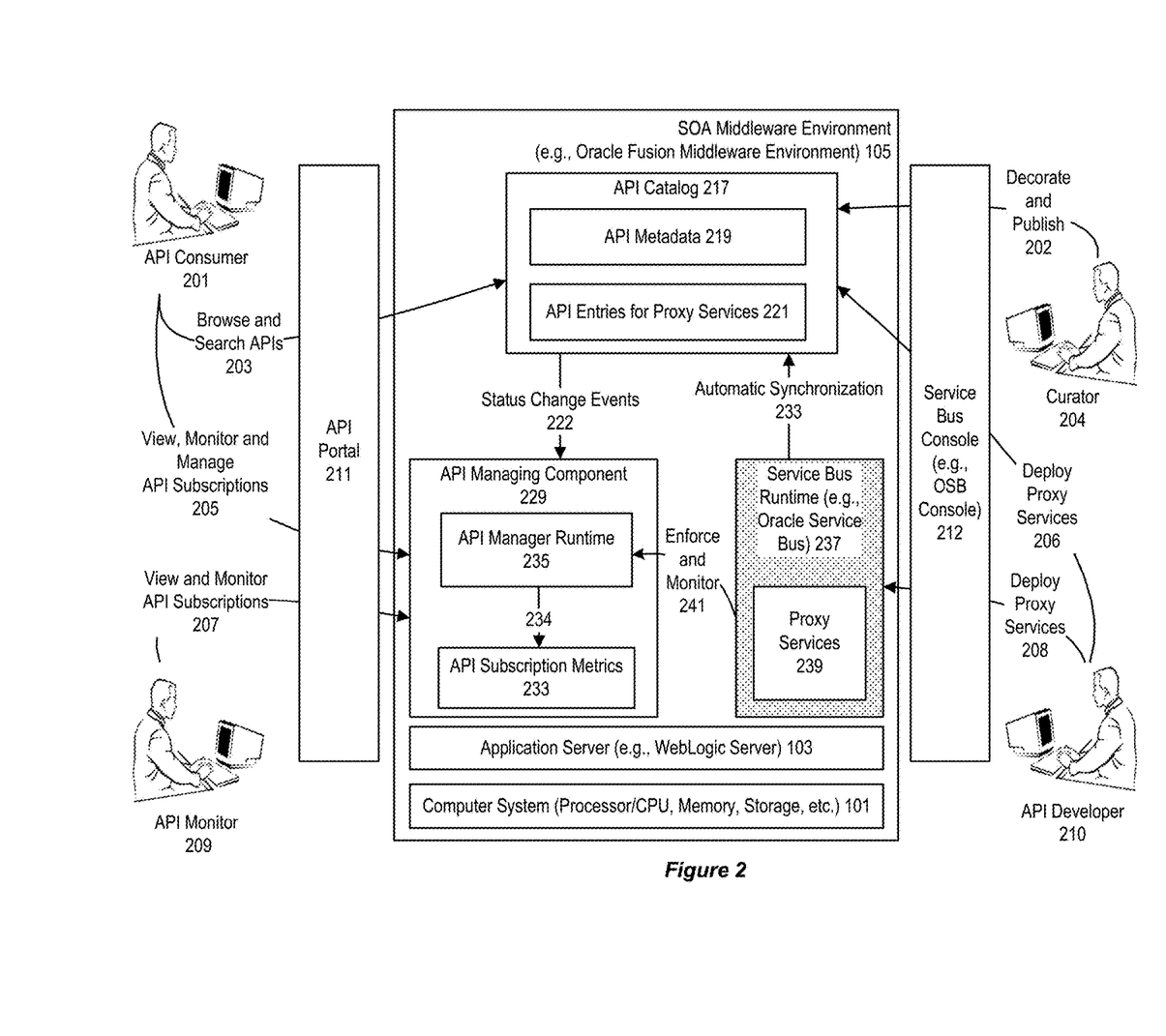
FIG. 2 illustrates an API manager for use with a service bus runtime, in accordance with an embodiment.

FIG. 2 illustrates an API manager for use with a service bus runtime, in accordance with an embodiment.

As shown, the system can include an API portal 211, an API managing component 229, an API catalog 217, and a service bus console 212, for use in deploying a proxy service to a service bus runtime 237, publishing the proxy service as an API for subscription, and managing and monitoring the API subscription.

In accordance with an embodiment, the service bus console can be used by an API developer 210 to deploy 208 proxy services to the service bus runtime, or deploy 206 proxy services to the API catalog.

In accordance with an embodiment, the API catalog can be embedded into the system, and can be configured to be started by a local catalog agent of the service bus runtime. The API catalog can be automatically synchronized 233 with the service bus runtime. As part of the synchronization, API entries in the API catalog that are not associated with a proxy service in the service bus runtime can be automatically deleted, and new API entries associated with newly added proxy services can be automatically created in a draft status in the service bus runtime.

In accordance with an embodiment, each API entry in the API catalog represents an API exposed from a particular proxy service implemented in the service bus runtime; and can be decorated and published 202 by an API curator 204 using the service bus console. When decorating an API entry, the API curator can add metadata to the API entry, including the name, description, version, tags, status, deprecated, references and security description of the particular underlying proxy service.

As shown in FIG. 2, the API catalog can include API metadata 219 added for a plurality of API entries 221.

In accordance with an embodiment, the added API metadata can be used by an API curator to browse and search for an API with a particular status (for example, published or draft). Similarly, the API metadata can be used by an API consumer 201 to browse and search 203 at the API portal for a particular API for subscription.

In accordance with an embodiment, an API subscription can only exist for an API that has been published in the embedded API catalog. As such, the API managing component needs to remain in-sync with the API catalog. The API managing component can register a listener with the API catalog for catalog status change events 222, such as catalog entry deletion and catalog entry status.

In accordance with an embodiment, an API can be unpublished or removed when the API is subscribed to. If the API has been removed, the API subscription can be marked using a special status indicator (for example, "ghost") in the API Portal to provide feedback to consumers, who can explicitly unsubscribe from the API.

In accordance with an embodiment, the API managing component can include an API manager runtime 235 that can enforce and monitor 241 API subscriptions using information passed from the service bus runtime. API subscription metrics 233 can be generated 234 by the API manager runtime for display at the API portal.

In accordance with an embodiment, the API consumer can view, monitor and manage 205 API subscriptions. The API consumer can subscribe to one or more APIs, or use a given API in multiple applications. The API consumer can view analytics or metrics for API subscriptions at different granularity: per consumer account, per application or per subscription. The metrics or analytics can be provided to the API consumer via the API portal using, e.g., a set of Java APIs.

In accordance with an embodiment, an API monitor 209 can log in with an API monitor role at the API portal, to view and monitor 207 subscriptions of a given API (for example, which consumers/applications are using the given API) at different granularity: per consumer, per application, per API subscription, and per API.

Figure 3:
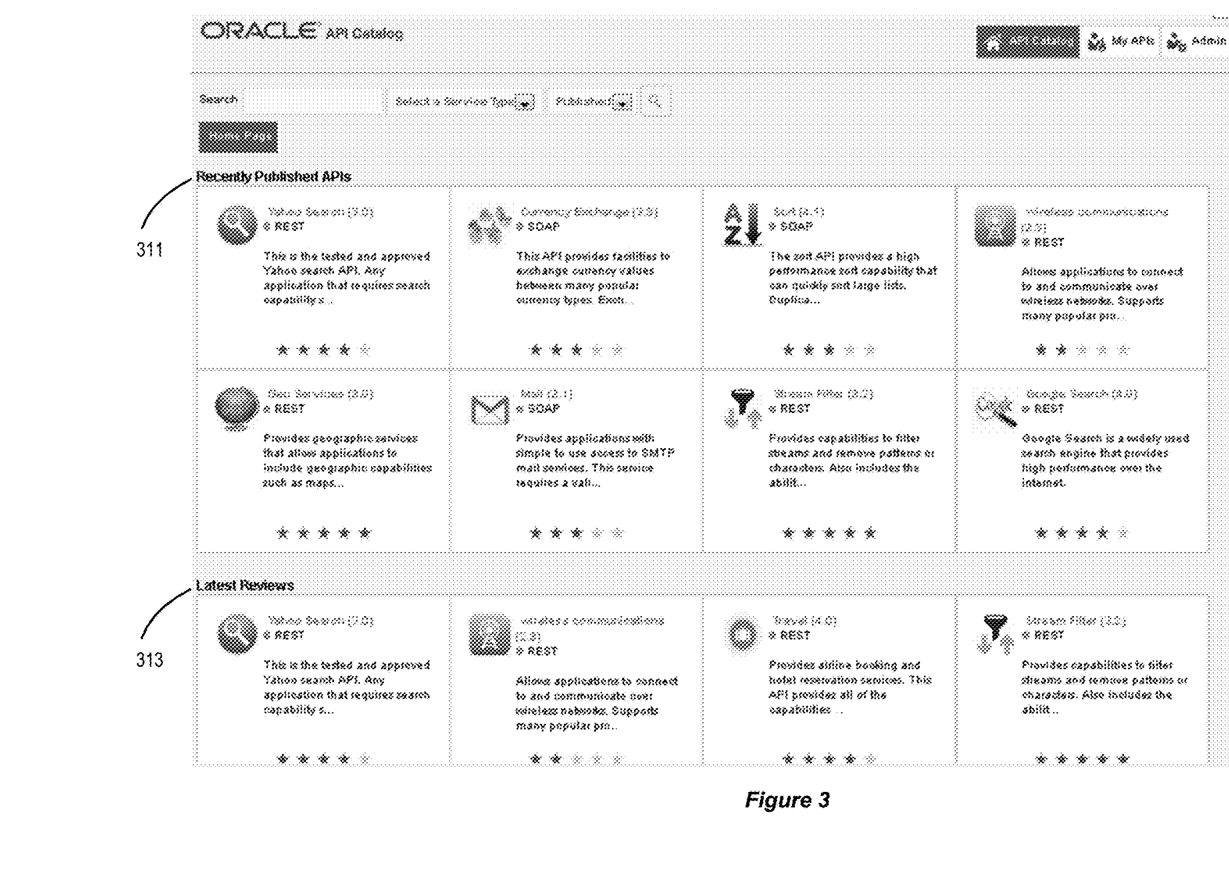
FIG. 3 illustrates an API catalog in accordance with an embodiment.

FIG. 3 illustrates a API catalog in accordance with an embodiment.

As shown in FIG. 3, the API catalog can display a plurality of entries for recently published APIs 311, for example, "Yahoo Search" and "Currency Exchange" APIs; and a plurality of entries 313 that have been recently reviewed.

As further shown in FIG. 3, for each API entry, the API catalog can display a description and a type of that API. For example, the "Yahoo Search" API is marked as REST API, and the "Currency Exchange" API is marked as a SOAP API.

Figure 4:
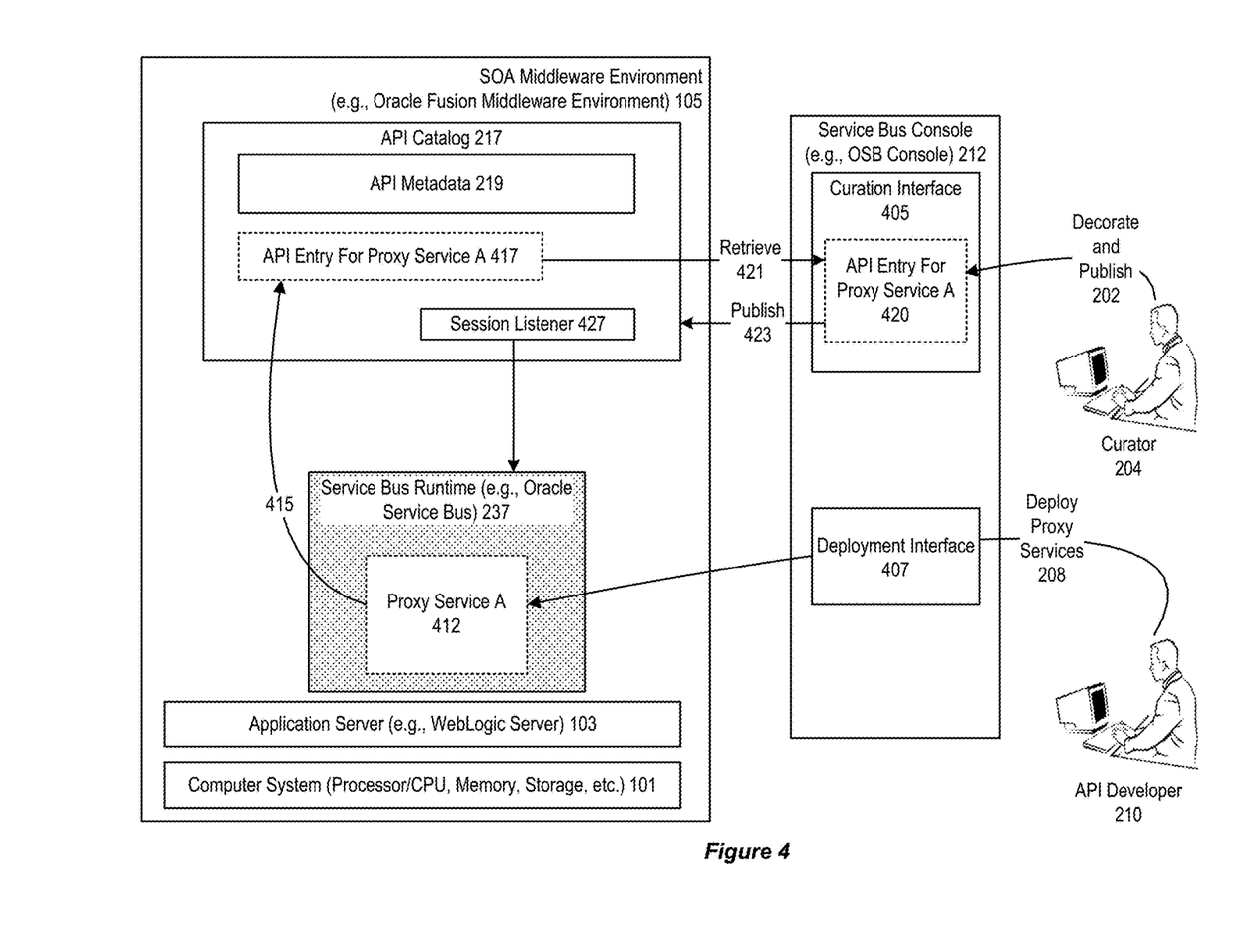
FIG. 4 further illustrates an API manager for use with a service bus runtime, in accordance with an embodiment.

FIG. 4 further illustrates an API manager for use with a service bus runtime, in accordance with an embodiment.

As shown in FIG. 4, a proxy service (for example, proxy service A 412) can be deployed to the service bus runtime by the API developer at a deployment interface 407 on the service bus console.

In accordance with an embodiment, a session listener 427 in the API catalog can be registered with the service bus runtime to provide automatic synchronization of the API catalog on activations of the service bus runtime.

For example, the registered session listener can detect that the proxy service A has been deployed to the service bus runtime, and can create an API entry 417 for proxy service A in the API catalog.

In accordance with an embodiment, the API catalog can be accessible via a curation interface (for example, extensions to the service bus console) 405, wherein the API entry 420 can be retrieved 421 for display at the curation interface. Attributes specific to the API entry can be available, so that the API curator can provide values to decorate the API entry.

In accordance with an embodiment, the API curator can publish 423 the API entry after providing decorative metadata to the API entry.

Figure 5:
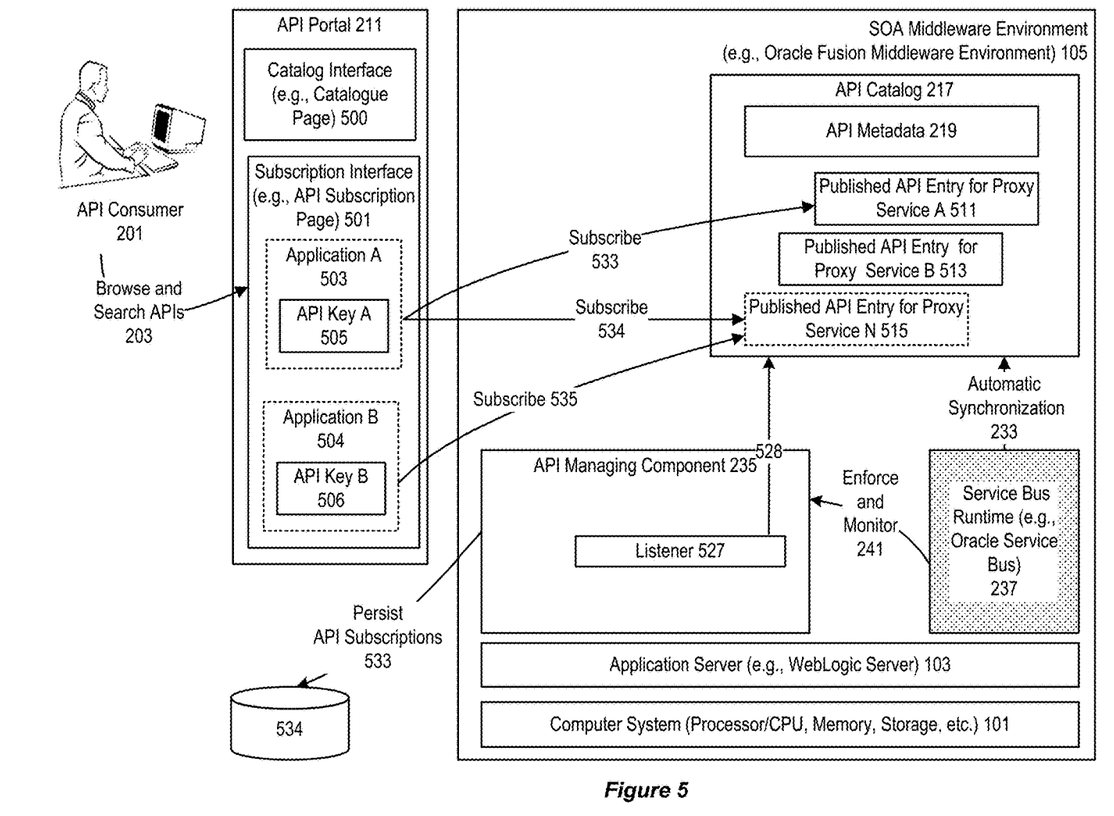
FIG. 5 further illustrates an API manager for use with a service bus runtime, in accordance with an embodiment.

FIG. 5 further illustrates an API manager for use with a service bus runtime, in accordance with an embodiment.

As shown in FIG. 5, the API catalog can includes a plurality of published API entries (for example, published API entry for proxy service A 511, published API entry for proxy service B 513, and published API entry for proxy service N 515), each corresponding to a proxy service executing in the service bus runtime. A published API (API entry) can be visible to an API consumer and can be subscribed to.

In accordance with an embodiment, when an API is published, the proxy service corresponding to the published API entry can start to receive requests.

In accordance with an embodiment, the API consumer can use the API portal to discover and research, subscribe to, and use APIs.

For example, the API consumer can use a catalog interface 500 on the API portal to discover and research new APIs, and use a subscription interface 501 to manage API subscriptions.

In accordance with an embodiment, the API consumer can use the API portal to find the necessary information to use the APIs in the API consumer's applications. Each application for which the API consumer intends to use published APIs can be represented in the API portal and be associated with an API key, which allows for the management of APIs and for the collection of subscription statistics for each application.

As shown in FIG. 5, a plurality of applications (for example, application A 503 and application B 504 can be created in the API portal, each application corresponding to an application that is hosted on an application server.

In accordance with an embodiment, each application represented in the API portal can be associated with an application-level API key (for example, API key A 405 and API key B 506). An API key can be a string token used to identify which API has been called by which application associated with a particular API consumer. An API Key can be defined either at the API subscription level or at the application level. At runtime, the API Key can be provided in a request via the HTTP header to a proxy service.

In accordance with an embodiment, a published API can be subscribed to by multiple API consumers, as well as by multiple applications for a given API consumer. An API subscription defines the relation between an API consumer, an application, and an API. Each API subscription can be managed and monitored independently at runtime.

For example, as shown in FIG. 5, published API entry for proxy service N can be subscribed to by both application A and application B, while application A can subscribe to both published API entry for proxy service A and published API entry for proxy service N.

In accordance with an embodiment, the API managing component can register a listener 427 to remain in-sync with the API catalog to manage API subscriptions.

In accordance with an embodiment, the API managing component can persist 533 API subscriptions to a database 534. The following information associated with an API subscription can be persisted: one or more API consumers, one or more application names, and an API identifier (from the API catalog). Information for applications that use the APIs can also be persisted.

For example, the information persisted for the applications can include one or more API consumers, a name, a description, and an API Key.

Figure 6:
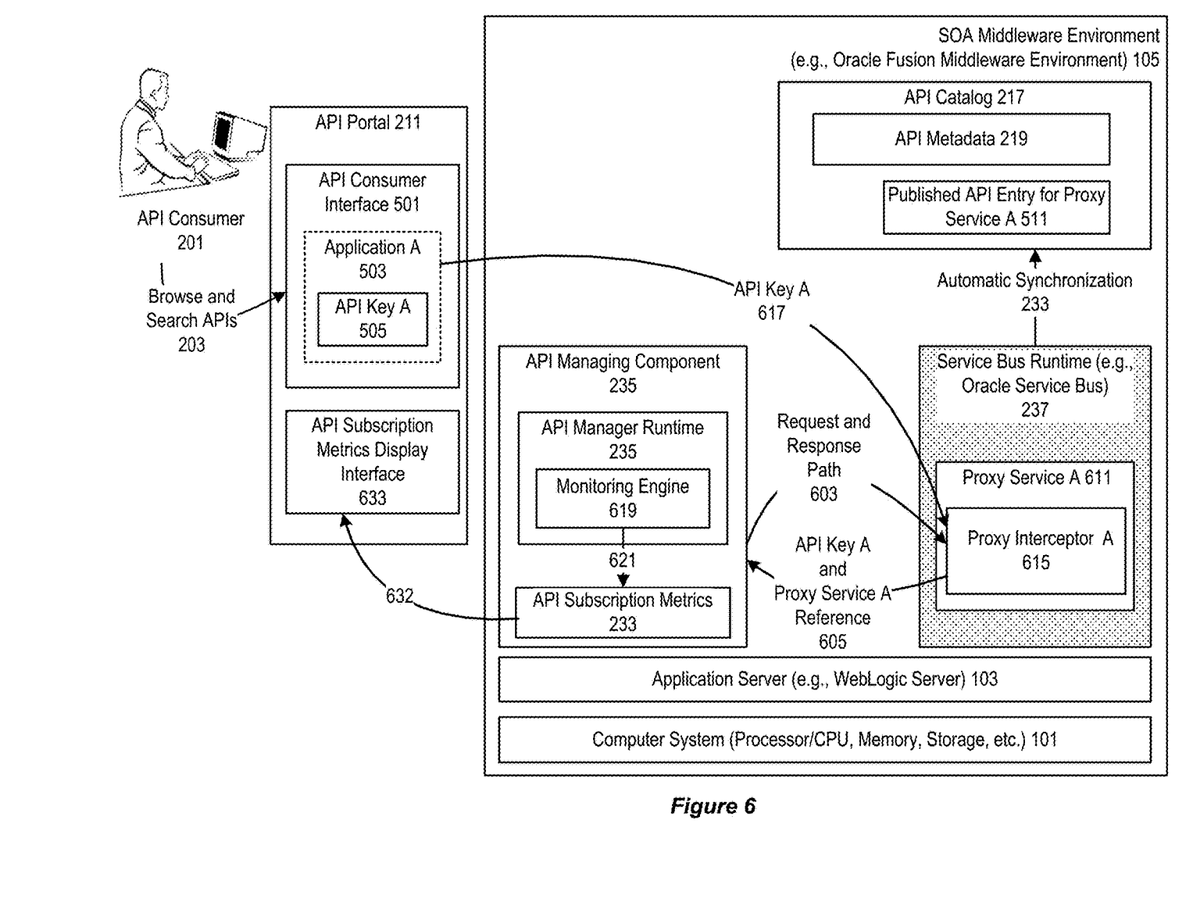
FIG. 6 further illustrates an API manager for use with a service bus runtime, in accordance with an embodiment.

FIG. 6 further illustrates an API manager for use with a service bus runtime, in accordance with an embodiment.

In accordance with an embodiment, a plurality of additional API level features (for example, entitlement, enforcement, and monitoring) for a particular API can be provided using a proxy interceptor, which can be added to the particular API's underlying proxy service.

For example, proxy interceptor A 615 can be provided to proxy service A 611 executing in the service bus runtime.

In accordance with an embodiment, application A that has subscribed to the API corresponding to proxy service A can provide the associated API key A in the header of a service request to the API. Proxy interceptor A can intercept the request, and delegate the request to the API managing component. For each API request from application A, proxy interceptor A can call the API managing component for a request and a response path 603. As part of the call, proxy interceptor A can provide the API Key A and a reference 605 for proxy service A to the API managing component.

In accordance with an embodiment, a proxy interceptor can be inserted as early as possible in a proxy service processing sequence, for example, before a policy and security component (for example, Oracle web service manager (OWSM) can be invoked.

In accordance with an embodiment, a proxy interceptor can be implemented as a servlet filter deployed with a web application, and can be inserted for all proxy services that can be exposed as an API, regardless whether the API has been published.

In accordance with an embodiment, the API managing component can perform enforcement to ensure that, for an API subscription, the API key is defined and that the proxy service reference matches an API subscription for a given application.

As further shown in FIG. 6, the API manager runtime can include a monitoring engine 619 for providing monitoring per API subscription, including generating 621 the API subscription metrics. The API key and proxy service reference passed by a proxy interceptor can be used to identify the API subscription and associated objects.

In accordance with an embodiment, an API implementation can use existing caching capabilities for reference services at the service bus runtime.

In accordance with an embodiment, applications and API subscriptions can be managed via the API portal deployed on an administration server, and the API managing component can be deployed on both the administration server and managed servers. The API keys can be distributed across a cluster at runtime so that the enforcement does not contribute much performance overhead. An in-memory data grid, such as Oracle Coherence, can be used as distributed caches for the API keys. The monitoring engine can be distributed across the cluster to reduce overhead contribution.

API Lifecycle

In accordance with an embodiment, the lifecycle of an API corresponding to a proxy service can include the following events:

Create: The proxy service is created and activated. Automatically, a new catalog entry is created in a draft status to represent an API exposed by the proxy service. An API curator can annotate or decorate the catalog entry.

Publish: The API is made visible to API consumer for subscription by publishing corresponding catalog entry.

Update: Updates to either the proxy service or the catalog entry is transparent to the API consumer. The updating can have a direct impact to the API consumer (for example, changing the proxy service URI) can be governed and controlled.

Unpublish: An API curator can decide to unpublish the API. The API managing component can be notified of the unpublishing, and can update its internal state, so that invocations to the API are rejected. The API is not visible to the API consumer in the API Portal, but the subscriptions to the API can be visible and marked with a status (for example, "ghost") indicating that the API has been unpublished.

Delete: The proxy service is deleted. Automatically, the corresponding catalog entry is deleted. The API managing component is notified of the deletion, and can update its internal state, so that invocations to the API are rejected. The API is not visible to the API consumer in the API Portal, but the subscriptions to the API can be visible and marked with a status (for example, "ghost") indicating that the API has been unpublished.

Figure 7:
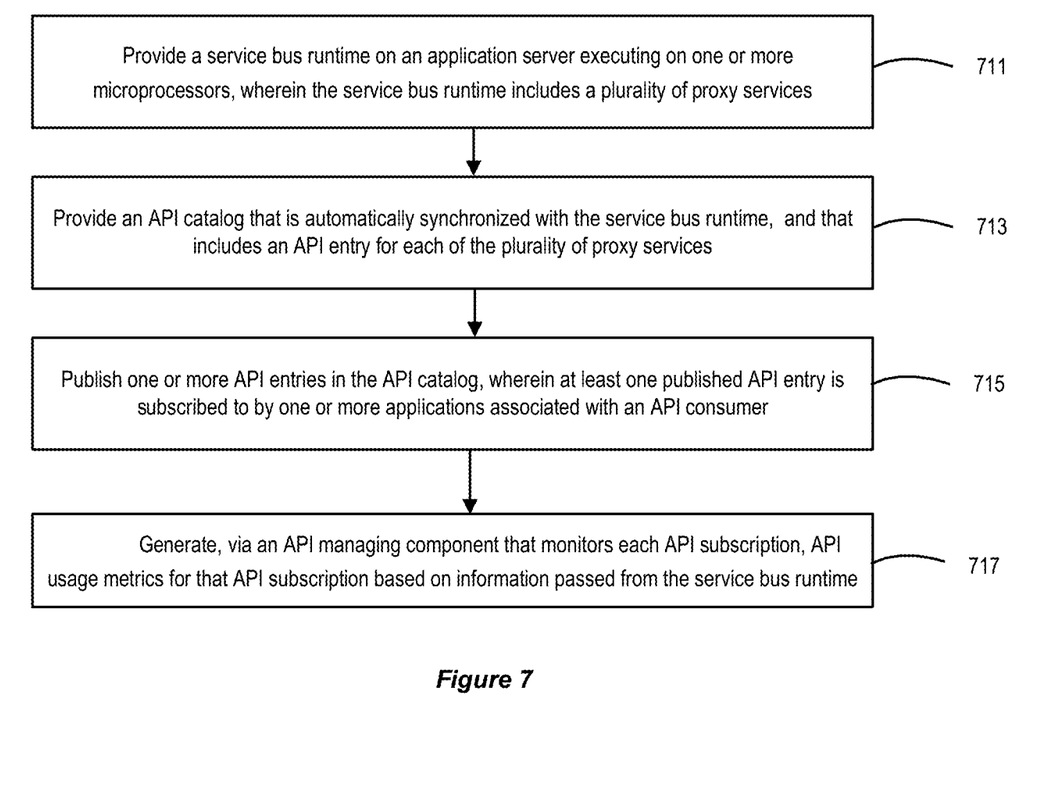
FIG. 7 illustrates method for providing an API manager for use with a service bus runtime, in accordance with an embodiment.

FIG. 7 illustrates method for providing an API manager for use with a service bus runtime, in accordance with an embodiment.

At step 711, a service bus runtime is provided on an application server executing on one or more microprocessors, wherein the service bus runtime includes a plurality of proxy services.

At step 713, an API catalog can be configured to be started by a local catalog agent of the service bus runtime, and can be automatically synchronized with the service bus runtime. The automatic synchronization can create an API entry in the API catalog for each proxy service in the service bus runtime.

At step 715, one or more API entries in the API catalog can be published by an API curator, and can be subscribed to by one or more applications associated with an API consumer.

At step 717, each API subscription can be monitored by an API managing component, which can generate API usages metrics for each monitored API subscription based on information passed from the service bus runtime.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated.

What is claimed is:

1. A system for providing an application programming interface (API) manager for use with a service bus runtime, comprising:
   a computer including one or more microprocessors;
   a service bus runtime, executing on the computer, that includes a plurality of proxy services;
   an API catalog that is automatically synchronized with the service bus runtime, and that includes an API entry for each of the plurality of proxy services, wherein one or more API entries are published, and available to be subscribed to by one or more applications associated with an API consumer; and
   an API managing component software operating on said computer that monitors each API subscription based on information passed from the service bus runtime, generates API usage metrics for each API subscription, and displays the usage metrics at the API portal.

2. The system of claim 1, wherein each of the plurality of proxy services is associated with a proxy interceptor implemented as a servlet filter deployed in the service bus runtime.

3. The system of claim 2, wherein a service invocation from an application to an API entry subscribed to by the application is intercepted by the proxy interceptor associated with the proxy service corresponding to the API entry, and delegated to the API managing component software.

4. The system of claim 1, wherein the information passed from the service bus runtime includes an API key and a reference for a proxy service.

5. The system of claim 4, wherein the API key is provided in a header of a service invocation from an application to a proxy service.

6. The system of claim 4, wherein the API key identifies a particular entry, an application that calls the particular API entry, and an API consumer associated with the application.

7. The system of claim 1, wherein the API catalog is automatically started by a local catalog agent of the service bus runtime.

8. A method for providing an application programming interface (API) manager for use with a service bus runtime, comprising:
   providing a service bus runtime, executing on one or more microprocessors, that includes a plurality of proxy services;

providing an API catalog that is automatically synchronized with the service bus runtime, and that includes an API entry for each of the plurality of proxy services;

publishing one or more API entries, wherein at least one published API entry is available to be subscribed to by one or more applications associated with an API consumer; and generating, via an API managing component software that monitors each API subscription, API usage metrics for that API subscription based on information passed from the service bus runtime, and displaying the usage metrics at the API portal.

9. The method of claim 8, wherein each of the plurality of proxy services is associated with a proxy interceptor implemented as a servlet filter deployed in the service bus runtime.

10. The method of claim 9, wherein a service invocation from an application to an API entry subscribed to by the application is intercepted by the proxy interceptor associated with the proxy service corresponding to the API entry, and delegated to the API managing component software.

11. The method of claim 8, wherein the information passed from the service bus runtime includes an API key and a reference for a proxy service.

12. The method of claim 11, wherein the API key is provided in a header of a service invocation from an application to a proxy service.

13. The method of claim 11, wherein the API key identifies a particular entry, an application that calls the particular API entry, and an API consumer associated with the application.

14. The method of claim 8, wherein the API catalog is automatically started by a local catalog agent of the service bus runtime.

15. A non-transitory computer-readable storage medium storing a set of instructions for providing an application programming interface (API) manager for use with a service bus runtime, said instructions, when executed by one or more processors, causing the one or more processors to perform steps comprising:

providing a service bus runtime, executing on one or more microprocessors, that includes a plurality of proxy services;

providing an API catalog that is automatically synchronized with the service bus runtime, and that includes an API entry for each of the plurality of proxy services;

publishing one or more API entries, wherein at least one published API entry is available to be subscribed to by one or more applications associated with an API consumer; and generating, via an API managing component software that monitors each API subscription, API usage metrics for that API subscription based on information passed from the service bus runtime, and displaying the usage metrics at the API portal.

16. The non-transitory computer-readable storage medium of claim 15, wherein each of the plurality of proxy services is associated with a proxy interceptor implemented as a servlet filter deployed in the service bus runtime.

17. The non-transitory computer-readable storage medium of claim 16, wherein a service invocation from an application to an API entry subscribed to by the application is intercepted by the proxy interceptor associated with the proxy service corresponding to the API entry, and delegated to the API managing component software.

18. The non-transitory computer-readable storage medium of claim 15, wherein the information passed from the service bus runtime includes an API key and a reference for a proxy service.

19. The non-transitory computer-readable storage medium of claim 18, wherein the API key is provided in a header of a service invocation from an application to a proxy service.

20. The non-transitory computer-readable storage medium of claim 18, wherein the API key identifies a particular entry, an application that calls the particular API entry, and an API consumer associated with the application.

* * * * *